United States Patent [19]

Pinsky et al.

[11] Patent Number: 5,112,706

[45] Date of Patent: * May 12, 1992

[54] COATED SUBSTRATES

[75] Inventors: Naum Pinsky, Thousand Oaks; Saulius A. Alkaitis, Venice, both of Calif.

[73] Assignee: Ensci, Inc., Santa Monica, Calif.

[*] Notice: The portion of the term of this patent subsequent to Dec. 15, 2004 has been disclaimed.

[21] Appl. No.: 398,051

[22] Filed: Aug. 24, 1989
(Under 37 CFR 1.47)

Related U.S. Application Data

[60] Division of Ser. No. 272,539, Nov. 17, 1988, which is a continuation-in-part of Ser. No. 82,277, Aug. 6, 1987, Pat. No. 4,787,125, which is a division of Ser. No. 843,047, Mar. 24, 1986, Pat. No. 4,713,306.

[51] Int. Cl.$^5$ .............................................. H01M 4/66
[52] U.S. Cl. ..................................... 429/233; 429/245; 428/432; 502/352
[58] Field of Search ................ 502/352; 429/218, 217, 429/210, 233, 245; 428/432

[56] References Cited

U.S. PATENT DOCUMENTS

| | | |
|---|---|---|
| 2,107,937 | 2/1938 | Hall . |
| 2,564,707 | 8/1951 | Mochel . |
| 3,562,127 | 2/1971 | Wooton et al. . |
| 3,870,567 | 3/1975 | Palmer et al. . |
| 3,890,429 | 6/1975 | Pytlewski . |
| 4,031,293 | 6/1977 | Voss et al. . |
| 4,229,491 | 10/1980 | Dislich et al. . |
| 4,275,130 | 6/1981 | Rippel et al. . |
| 4,297,420 | 10/1981 | Chenaux et al. . |
| 4,326,017 | 4/1982 | Will . |
| 4,371,740 | 2/1983 | Clem ................................ 136/256 |
| 4,405,697 | 9/1983 | Rowlette . |
| 4,451,542 | 5/1984 | Ishida et al. ....................... 429/174 |
| 4,473,623 | 9/1984 | Ishikura et al. . |
| 4,510,219 | 4/1985 | Rowlette . |
| 4,539,268 | 9/1985 | Rowlette . |
| 4,542,082 | 9/1985 | Rowlette . |
| 4,547,443 | 10/1985 | Rowlette et al. .................. 429/217 |
| 4,614,669 | 9/1986 | Yannopoulos ............... 427/126.1 X |
| 4,708,918 | 11/1987 | Fitzgerald et al. . |
| 4,713,306 | 12/1987 | Pinsky et al. ................. 429/233 X |
| 4,787,125 | 11/1988 | Pinsky et al. ................. 429/212 X |

FOREIGN PATENT DOCUMENTS 53-9807 1/1978 Japan .
22674 of 1894 United Kingdom .
1572333 7/1980 United Kingdom .

Primary Examiner—Stephen Kalafut
Attorney, Agent, or Firm—Frank J. Uxa, Jr.

[57] ABSTRACT

A composition comprising an acid resistant substrate coated with electrically conductive, fluoride ion doped tin oxide.

45 Claims, No Drawings

COATED SUBSTRATES

RELATED APPLICATIONS

This application is a division of co-pending application Ser. No. 272,539 filed Nov. 17, 1988 which is a continuation-in-part of co-pending application Ser. No. 082,277, filed Aug. 6, 1987, now U.S. Pat. No. 4,787,125, which application, in turn, is a division of application Ser. No. 843,047, filed Mar. 24, 1986, now U.S. Pat. No. 4,713,306. Both this earlier filed application and these patents are incorporated in their entireties herein by reference.

BACKGROUND OF THE INVENTION

The present invention relates to a coated substrate. More particularly, the invention relates to a substrate coated with a tin oxide-containing material, preferably an electronically conductive tin oxide-containing material.

Even though there has been considerable study of alternative electrochemical systems, the lead-acid battery is still the battery of choice for general purposes, such as starting an automotive vehicle, boat or airplane engine, emergency lighting, electric vehicle motive power, energy buffer storage for solar-electric energy, and field hardware, both industrial and military. These batteries may be periodically charged from a generator.

The conventional lead-acid battery is a multi-cell structure. Each cell comprises a set of vertical positive and negative plates formed of lead-acid alloy grids containing layers of electrochemically active pastes. The paste on the positive plate when charged comprises lead dioxide, which is the positive active material, and the negative plate contains a negative active material such as sponge lead. An acid electrolyte, based on sulfuric acid, is interposed between the positive and negative plates.

Lead-acid batteries are inherently heavy due to use of the heavy metal lead in constructing the plates. Modern attempts to produce light-weight lead-acid batteries, especially in the aircraft, electric car and automotive vehicle fields, have placed their emphasis on producing thinner plates from lighter weight materials used in place of and in combination with lead. The thinner plates allow the use of more plates for a given volume, thus increasing the power density.

Higher voltages are provided in a bipolar battery including bipolar plates capable of through-plate conduction to serially connected electrodes or cells. The bipolar plates must be impervious to electrolyte and be electrically conductive to provide a serial connection between electrodes.

U.S. Pat. Nos. 4,275,130; 4,353,969; 4,405,697; 4,539,268; 4,507,372; 4,542,082; and 4,510,219; relate to various aspects of lead-acid batteries. Certain of these patents discuss various aspects of bipolar plates.

Attempts have been made to improve the conductivity and strength of bipolar plates. Such attempts include the use of conductive carbon particles or filaments such as carbon, graphite or metal in a resin binder. However, such carbon-containing materials are oxidized in the aggressive electrochemical environment of the positive plates in the lead-acid cell to acetic acid, which in turn reacts with the lead ion to form lead acetate, which is soluble in sulfuric acid. Thus, the active material is gradually depleted from the paste and ties up the lead as a salt which does not contribute to the production or storage of electricity.

The metals fare no better; most metals are not capable of withstanding the high potential and strong acid environment present at the positive plates of a lead-acid battery. While some metals, such as platinum, are electrochemically stable, their prohibitive cost prevents their use in high volume commercial applications of the lead-acid battery.

In "Preparation of Thick Crystalline Films of Tin Oxide and Porous Glass Partially Filled with Tin Oxide", by R. G. Bartholomew et al, J. Electrochem, Soc. Vol 116, No. 9, p 1205(1969), a method is desribed for producing films of $SnO_2$ on a 96% silica glass substrate by oxidation of stannous chloride. The plates of glass are pretreated to remove moisture, and the entire coating process appears to have been done under anhydrous conditions. Specific electrical resistivity values for $SnO_2$-porous glass were surprisingly high. In addition, doping with $SbCl_3$ was attempted, but substantially no improvement, i.e., reduction, in electricall resistivity was observed. Apparently, no effective amount of antimony was incorporated. No other dopant materials were disclosed.

In "Physical Properties of Tin Oxide Films Deposited by Oxidation of $SnCl_2$", by N. Srinvasa Murty et al, Thin Solid Filmas, 92(1982) 347-354, a method for depositing $SnO_2$ films was disclosed which involved contacting a substrate with a combined vapor of $SnCl_2$ and oxygen. Although no dopants were used, dopant elements such as antimony and fluorine were postulated as being useful to reduce the electrical resistivity of the $SnO_2$ films.

SUMMARY OF THE INVENTION

One approach that shows promise of providing benefits in lead acid batteries is a battery element, useful as at least a portion of the positive plates of the battery, which comprises an acid resistant substrate coated with a stable doped tin oxide.

The combination of an acid resistant substrate coated with doped tin oxide has substantial electrical, chemical, physical and mechanical properties making it useful as a lead-acid battery element. For example, the element has substantial stability in the presence of, and is impervious to, the sulfuric acid or the sulfuric acid-based electrolyte. The doped tin oxide coating on the acid resistant substrate provides for increased electrochemical stability and reduced corrosion in the aggressive, oxidative-acidic conditions present on the positive side of lead-acid batteries.

The use of a fluorine dopant is an important feature of the present invention. First, it has been found that fluorine, i.e., fluoride ion, dopants can be effectively and efficiently incorporated into the tin oxide-containing coating. In addition, such fluorine dopants act to provide tin oxide-containing coatings with good electronic properties referred to above, morphology and stability. This is in contrast to certain of the prior art which found antimony dopants to be ineffective to improve the electronic properties of tin oxide coatings.

A number of techniques may be employed to provide conductive tin oxide coatings on acid resistant substrates. For example, the chemical vapor deposition (CVD) process may be employed. This process comprises contacting a substrate with a vaporous composition comprising a tin component and a dopant-containing material and contacting the contacted substrate with an oxygen-containing vaporous medium at conditions effective to form the doped tin oxide coating on the substrate. In addition, the substrate coating processes described in the above-noted, related (and incorporated) patent application may be advantageously employed to provide the present coated substrates.

The thickness of the tin oxide-containing coating is preferably in the range of about 0.1 micron to about 10 microns, more preferably about 0.25 micron to about 1.25 microns.

DETAILED DESCRIPTION OF THE INVENTION

The substrate may be composed of any suitable material and may be in any suitable form. Preferably, the substrate is such so as to minimize or substantially eliminate the migration of ions and other species, if any, from the substrate to the tin oxide-containing coating which are deleterious to the functioning or performance of the coated substrate in a particular application. In addition, it can be precoated to minimize migration, for example a silica precoat and/or to improve wetability and uniform distribution of the coating materials on the substrate. In order to provide for controlled electronic conductivity in the fluorine doped tin oxide coating, it is preferred that the substrate be substantially non-electronically conductive when the coated substrate is to be used as a component of an electric energy storage battery. In one embodiment, the substrate is inorganic, for example glass and/or ceramic. Two, or preferably three, dimensional substrates may be used. Examples of three dimensional substrates which can be coated using the present process include spheres, extrudates, flakes, single fibers, fiber rovings, chopped fibers, fiber mats, porous substrates, irregularly shaped particles, e.g., catalyst supports, multi-channel monoliths and the like. Acid resistant glass fibers, especially woven and nonwoven mats of acid resistant glass fibers, are particularly useful substrates when the fluorine doped tin oxide coated substrate is to be used as a component of a battery, such as a lead-acid electrical energy storage battery. More particularly, the substrate for use in a battery is in the form of a body of woven or non-woven fibers, still more particularly, a body of fibers having a porosity in the range of about 60% to about 95%. Porosity is defined as the percent or fraction of void space within a body of fibers. The above-noted porosities are calculated based on the fibers including the desired fluorine doped tin oxide coating. The substrate for use in lead-acid batteries, because of availability, cost and performance considerations, preferably comprises acid resistant glass, more preferably in the form of fibers, as noted above.

The substrate for use in lead-acid batteries is acid resistant. That is, the substrate exhibits some resistance to corrosion, erosion and/or other forms of deterioration at the conditions present, e.g., at or near the positive plate, or positive side of the bipolar plates, in a lead-acid battery. Although the fluorine doped tin oxide coating does provide a degree of protection for the substrate against these conditions, the substrate should itself have an inherent degree of acid resistance. If the substrate is acid resistant, the physical integrity and electrical effectiveness of the doped tin oxide coating and of the whole present battery element, is better maintained with time relative to a substrate having reduced acid resistance. If glass is used as the substrate, it is preferred that the glass have an increased acid resistance relative to E-glass. Preferably, the acid resistant glass substrate is at least as resistant as is C-or T- glass to the conditions present in a lead-acid battery.

Typical compositions of E-glass and C-glass are as follows:

|  | Weight Percent | | |
| --- | --- | --- | --- |
|  | E-glass | C-glass | T-glass |
| Silica | 54 | 65 | 65 |
| Alumina | 14 | 4 | 6 |
| Calcia | 18 | 14 | 10* |
| Magnesia | 5 | 3 | — |
| Soda + Potassium Oxide | 0.5 | 9 | 13 |
| Boria | 8 | 5 | 6 |
| Titania + Iron Oxide | 0.5 | — | — |

*including MgO

Preferably the glass contains more than about 60% by weight of silica and less than about 35% by weight of alumina, and alkali and alkaline earth metal oxides.

The fluorine doped tin oxide coated substrate of the present invention may be, for example, a catalyst itself or a component of a composite together with one or more matrix materials. The composites may be such that the matrix material or materials substantially totally encapsulate or surround the coated substrate, or a portion of the coated substrate may extend away from the matrix material or materials.

Any suitable matrix material or materials may be used in a composite with the fluorine doped tin oxide coated substrate. Preferably, the matrix material comprises a polymeric material, e.g., one or more synthetic polymers, more preferably an organic polymeric material. The polymeric material may be either a thermoplastic material or a thermoset material. Among the thermoplastics useful in the present invention are the polyolefins, such as polyethylene, polypropylene, polymethylpentene and mixtures thereof; and poly vinyl polymers, such as polystyrene, polyvinylidene difluoride, combinations of polyphenylene oxide and polystyrene, and mixtures thereof. Among the thermoset polymers useful in the present invention are epoxies, phenol-formaldehyde polymers, polyesters, polyvinyl esters, polyurethanes, melamine-formaldehyde polymers, and urea-formaldehyde polymers.

When used in battery applications, the present doped tin oxide coated substrate is preferably at least partially embedded in a matrix material. The matrix material should be at least initially fluid impervious to be useful in batteries. If the fluorine doped tin oxide coated substrate is to be used as a component in a battery, e.g., a lead-acid electrical energy storage battery, it is situated so that at least a portion of it contacts the positive active electrode material. Any suitable positive active electrode material or combination of materials useful in lead-acid batteries may be employed in the present invention. One particularly useful positive active electrode material comprises electrochemically active lead oxide, e.g., lead dioxide, material. A paste of this material is often used. If a paste is used in the present invention, it is applied so that there is appropriate contacting between the fluorine doped tin oxide coated substrate and the paste.

In order to provide enhanced bonding between the fluorine doped tin oxide coated substrate and the matrix material, it has been found that the preferred matrix materials have an increased polarity, as indicated by an increased dipole moment, relative to the polarity of polypropylene. Because of weight and strength considerations, if the matrix material is to be a thermoplastic polymer, it is preferred that the matrix be a polypropylene-based polymer which includes one or more groups effective to increase the polarity of the polymer relative to polypropylene. Additive or additional monomers, such as maleic anhydride, vinyl acetate, acrylic acid, and the like and mixtures thereof, may be included prior to propylene polymerization to give the product propylene-based polymer increased polarity. Hydroxyl groups may also be included in a limited amount, using conventional techniques, to increase the polarity of the final propylene-based polymer.

Thermoset polymers which have increased polarity relative to polypropylene are more preferred for use as the present matrix material. Particularly preferred thermoset polymers include epoxies, phenol-formaldehyde polymers, polyesters, and polyvinyl esters.

A more complete discussion of the presently useful matrix materials is presented in Fitzgerald, et al U.S. Pat. No. 4,708,918, the entire disclosure of which is hereby incorporated by reference herein.

Various techniques, such as casting, molding and the like, may be used to at least partially encapsulate or embed the fluorine doped tin oxide coated substrate into the matrix material or materials and form composites. The choice of technique may depend, for example, on the type of matrix material used, the type and form of the substrate used and the specific application involved. Certain of these techniques are presented in U.S. Pat. No. 4,547,443, the entire disclosure of which is hereby incorporated by reference herein. One particular embodiment involves pre-impregnating (or combining) that portion of the doped tin oxide coated substrate to be embedded in the matrix material with a relatively polar (increased polarity relative to polypropylene) thermoplastic polymer, such as polyvinylidene difluoride, prior to the coated substrate being embedded in the matrix material. This embodiment is particularly useful when the matrix material is itself a thermoplastic polymer, such as modified polypropylene, and has been found to provide improved bonding between the fluorine doped tin oxide coated substrate and the matrix material.

The bonding between the matrix material and the fluorine doped tin oxide coated, acid-resistant substrate is important to provide effective battery operation. In order to provide for improved bonding of the fluorine doped tin oxide coating (on the substrate) with the matrix material, it is preferred to at least partially, more preferably substantially totally, coat the fluorine doped tin oxide coated substrate with a coupling agent which acts to improve the bonding of the fluorine doped tin oxide coating with the matrix. This is particularly useful when the substrate comprises acid resistant glass fibers. Any suitable coupling agent may be employed. Such agents preferably comprise molecules which have both a polar portion and a non-polar portion. Certain materials generally in use as sizing for glass fibers may be used here as a "size" for the doped tin oxide coated glass fibers. The amount of coupling agent used to coat the fluorine doped tin oxide coated glass fibers should be effective to provide the improved bonding noted above and, preferably, is substantially the same as is used to size bare glass fibers. Preferably, the coupling agent is selected from the group consisting of silanes, silane derivatives, stannates, stannate derivatives, titanates, titanate derivatives and mixtures thereof. U.S. Pat. No. 4,154,638 discloses one silane-based coupling agent adapted for use with tin oxide surfaces. The entire disclosure of this patent is hereby expressly incorporated by reference herein.

In the embodiment in which the fluorine doped tin oxide coated substrate is used as a component of a bipolar plate in a lead-acid battery, it is preferred to include a fluid-impervious conductive layer that is resistant to reduction adjacent to, and preferably in electrical communication with, the second surface of the matrix material. The conductive layer is preferably selected from metal, more preferably lead, and substantially non-conductive polymers, more preferably synthetic polymers, containing conductive material. The non-conductive polymers may be chosen from the polymers discussed previously as matrix materials. One particular embodiment involves using the same polymer in the matrix material and in the conductive layer. The electrically conductive material contained in the non-conductive layer preferably is selected from the group consisting of graphite, lead and mixtures thereof.

In the bipolar plate configuration, a negative active electrode layer located to, and preferably in electric communication with, the fluid impervious conductive layer is included. Any suitable negative active electrode material useful in lead-acid batteries may be employed. One particularly useful negative active electrode material comprises lead, e.g., sponge lead. Lead paste is often used.

In yet another embodiment, a coated substrate including tin oxide, preferably electronically conductive tin oxide, and at least one additional catalyst component in an amount effective to promote a chemical reaction is formed. Preferably, the additional catalyst component is a metal and/or a component of a metal effective to promote the chemical reaction. The promoting effect of the catalyst component may be enhanced by the presence of an electrical field or electrical current in proximity to the component. Thus, the tin oxide, preferably on a substantially non-electronically conductive substrate, e.g., a catalyst support, can provide an effective and efficient catalyst for chemical reactions, including those which occur or are enhanced when an electric field or current is applied in proximity to the catalyst component. Thus, it has been found that the present coated substrates are useful as active catalysts and supports for additional catalytic components. Without wishing to limit the invention to any particular theory of operation, it is believed that the outstanding stability, e.g., with respect to electronic properties and/or morphology and/or stability, of the present tin oxides plays an important role in making useful and effective catalyst materials. Any chemical reaction, including a chemical reaction the rate of which is enhanced by the presence of an electrical field or electrical current as described herein, may be promoted using the present catalyst component tin oxide-containing coated substrates. A particularly useful class of chemical reactions are those involving chemical oxidation or reduction. For example, an especially useful and novel chemical reduction includes the chemical reduction of nitrogen oxides, to minimize air pollution, with a reducing gas such as carbon monoxide, hydrogen and mixtures thereof and-/or an electron transferring electrical field. Of course, other chemical reactions, e.g., hydrocarbon reforming, dehydrogenation, such as alkylaromatics to olefins and olefins to dienes, hydrodecyclization, isomerization, ammoxidation, such as with olefins, aldol condensations using aldehydes and carboxylic acids and the like, may be promoted using the present catalyst component, tin oxide-containing coated substrates. As noted above, it is preferred that the tin oxide in the catalyst component, tin oxide-containing substrates be electronically conductive. Although fluorine doped tin oxide is particularly useful, other dopants may be incorporated in the present catalyst materials to provide the tin oxide with the desired electronic properties. For example, antimony may be employed as a tin oxide dopant. Such other dopants may be incorporated into the final catalyst component, tin oxide-containing coated substrates using one or more processing techniques substantially analogous to procedures useful to incorporate fluorine dopant, e.g., as described herein.

Particularly useful chemical reactions as set forth above include the oxidative dehydrogenation of ethylbenzene to styrene and 1-butene to 1,3-butadiene; the ammoxidation of propylene to acrylonitrile; aldol condensation reactions for the production of unsaturated acids, i.e., formaldehyde and propionic acid to form methacrylic acid and formaldehyde and acetic acid to form acrylic acid; the isomerization of butenes; and the oxidation of methane to methanol. It is believed, without limiting the invention to any specific theory of operation, that the stability of the catalysts, the redox activity of the tin oxide, i.e., stannous, stannic, mixed tin oxide redox couple, morphology and the tin oxide catalytic and/or support interaction with other catalytic species provides for the making of useful and effective catalyst materials. In certain catalytic reactions, such as $NO_x$ reduction and oxidative dehydrogenation, it is believed that lattice oxygen from the regenerable tin oxide redox couple participates in the reactions.

The tin oxide-containing coated substrates of the present invention may be employed alone or as a catalyst and/or support in a sensor, in particular gas sensors. Preferably, the coated substrates includes a sensing component similar to the catalyst component, as described herein. The present sensors are useful to sense the presence or concentration of a component, e.g., a gaseous component, of interest in a medium, for example, hydrogen, carbon monoxide, methane and other alkanes, alcohols, aromatics, e.g., benzene, water, etc., e.g., by providing a signal in response to the presence or concentration of a component of interest, e.g., a gas of interest, in a medium. Such sensors are also useful where the signal provided is enhanced by the presence of an electrical field or current in proximity to the sensing component. The sensing component is preferably one or more metals or metallic containing sensing components, for example, platinum, palladium, silver and zinc. The signal provided may be the result of the component of interest itself impacting the sensing component and/or it may be the result of the component of interest being chemically reacted, e.g., oxidized or reduced, in the presence of the sensing component.

The stability and durability for the present tin oxide materials are believed to make them very useful as catalysts, sensors, and supports for additional catalysts and sensors in aggressive and/or harsh environments, particularly acid, i.e., sulfur and nitrogen acid environments.

Any suitable catalyst component (or sensing component) may be employed, provided that it functions as described herein. Among the useful metal catalytic components and metal sensing components are those selected from components of the transition metals, the rare earth metals, certain other catalytic components and mixtures thereof, in particular catalysts containing gold, silver, copper, vanadium, chromium, tungsten, zinc, indium, antimony, the platinum group metals, i.e., platinum, palladium, iron, nickel, manganese, cesium, titanium, etc. Although metal containing compounds may be employed, it is preferred that the metal catalyst component (and/or metal sensing component) included with the coated substrate comprise elemental metal and/or metal in one or more active oxidized forms, for example, $Cr_2O_3$, $Ag_2O$, $Sb_2O_4$, etc.

The preferred support materials include a wide variety of materials used to support catalytic species, particularly porous refractory inorganic oxides. These supports include, for example, alumina, silica, zirconia, magnesia, boria, phosphate, titania, ceria, thoria and the like, as well as multi-oxide type supports such as alumina-phosphorous oxide, silica alumina, zeolite modified inorganic oxides, e.g., silica alumina, and the like. As set forth above, support materials can be in many forms and shapes, especially porous shapes which are not flat surfaces, i.e., non line-of-site materials. A particularly useful catalyst support is a multi channel monolith made from corderite which has been coated with alumina. The catalyst materials can be used as is or further processed such as by sintering of powered catalyst materials into larger aggregates. The aggregates can incorporate other powders, for example, other oxides, to form the aggregates.

The catalyst components (or sensing components) may be included with the coated substrate using any one or more of various techniques, e.g., conventional and well known techniques. For example, metal catalyst components (metal sensing components) can be included with the coated substrate by impregnation; electrochemical deposition; spray hydrolysis; deposition from a molten salt mixture; thermal decomposition of a metal compound or the like. The amount of catalyst component (or sensing component) included is sufficient to perform the desired catalytic (or sensing function), respectively, and varies from application to application. In one embodiment, the catalyst component (or sensing component) is incorporated while the tin oxide is placed on the substrate. Thus, a catalyst material, such as a salt or acid, e.g., a halide and preferably chloride, oxy chloride and cloro acids, e.g., chloro platinic acid, of the catalytic metal, is incorporated into the stannous chloride-containing coating of the substrate, prior to contact with the oxidizing agent, as described herein. This catalyst material can be combined with the stannous chloride and contacted with the substrate, or it may be contacted with the substrate separately from stannous chloride before, during and/or after the stannous chloride/substrate contacting.

The preferred approach is to incorporate catalyst-forming materials into a process step used to form a tin oxide coating. This minimizes the number of process steps but also, in certain cases, produces more effective catalysts. The choice of approach is dependent on a number of factors, including the process compatibility of tin oxide and catalyst-forming materials under given process conditions and the overall process efficiency and catalyst effectiveness.

The tin oxide coated substrates of the present invention are useful in other applications as well. For example, such substrates may be employed as an active component and/or as supports for active components in gas purification systems, filter medium systems, flocculent systems and other systems in which the stability and durability of such substrates can be advantageously utilized.

Particular applications which combine many of the outstanding properties of the products of the present invention include electro membrane separations for food processing, textile/leather processing, chemical processesing, bio medical processing and water treatment. For example, various types of solutions can be further concentrated, e.g., latexs concentrated, proteins isolated, colloids removed, salts removed, etc. The membranes can be used in flat plate, tubular and/or spiral wound system design. In addition, the products of this invention can be used as polymeric composites for electromagnetic and electrostatic shielding applications used for computers, telecommunications and electronic assemblies, as well as in low radar observable systems.

A particularly unique application that relies upon stable electronic conductivity and the physical durability of the products of this invention are dispersions of conductive material, such as powders, in fluids, e.g., water, hydrocarbons, e.g., mineral or synthetic oils, whereby an increase in viscosity, to even solidification, is obtained when an electrical field is applied to the system. These fluids are referred to as "field dependent" fluids which congeal and which can withstand forces of shear, tension and compression. These fluids revert to a liquid state when the electric field is turned off. Applications include dampening, e.g., shock absorbers, variable speed transmissions, clutch mechanisms, etc.

While this invention has been described with respect to various specific examples and embodiments, it is to be understood that the invention is not limited thereto and that it can be variously practiced within the scope of the following claims.

What is claimed is:

1. An article comprising an acid resistant substrate other than electrically conductive fluoride ion doped tin oxide in the form of fibers or particles coated with electrically conductive, fluoride ion doped tin oxide.

2. The article of claim 1 which further comprises said coated substrate embedded in a matrix material.

3. The article of claim 2 wherein said matrix material is a polymeric material.

4. The article of claim 1 wherein said acid resistant substrate is inorganic.

5. The article of claim 4 wherein said acid resistant substrate is in the form of fibers.

6. The article of claim 4 wherein said acid resistant substrate in the form of particles.

7. The article of claim 5 wherein said fibers are in a form selected from the group consisting of fiber rovings, chopped fibers, single fibers, and woven fibers.

8. The article of claim 7 wherein said fibers comprise acid resistant glass.

9. The article of claim 8 wherein said acid resistant glass has increased acid resistance relative to E-glass.

10. The article of claim 8 wherein said acid resistant glass is at least as acid resistant as C-glass.

11. The article of claim 5 wherein the average thickness of said doped tin oxide coating on said fibers is in the range of about 10 microns or less.

12. The article of claim 7 wherein the average thickness of said doped tin oxide coating on said fibers is in the range of about 10 microns or less.

13. The article of claim 9 wherein the average thickness of said doped tin oxide coating on said fibers is in the range of about 10 microns or less.

14. The article of claim 4 wherein said fluoride ion is present in said coating in an amount effective to improve the electrical conductivity of said coating.

15. The article of claim 7 wherein said fluoride ion is present in said coating in an amount effective to improve the electrical conductivity of said coating.

16. The article of claim 8 wherein said fluoride ion is present in said coating in an amount effective to improve the electrical conductivity of said coating.

17. The article of claim 6 wherein said fluoride ion is present in said coating in an amount effective to improve the electrical conductivity of said coating.

18. The article of claim 4 which further comprises said coated substrate at least partially embedded in a polymeric matrix material.

19. The article of claim 5 which further comprises said coated substrate at least partially embedded in a polymeric matrix material.

20. The article of claim 7 which further comprises said coated substrate at least partially embedded in a polymeric matrix material.

21. The article of claim 9 which further comprises said coated substrate at least partially embedded in a polymeric matrix material.

22. The article of claim 11 which further comprises said coated substrate at least partially embedded in a polymeric matrix material.

23. The article of claim 15 which further comprises said coated substrate at least partially embedded in a polymeric matrix material.

24. The article of claim 18 wherein said polymeric matrix material is selected from the group consisting of polyolefins, poly vinyl polymers, epoxy-based polymers, phenol-formaldehyde polymers, polyesters and polyvinyl esters.

25. The article of claim 20 wherein said polymeric matrix material is selected from the group consisting of polyolefins, poly vinyl polymers, epoxy-based polymers, phenol-formaldehyde polymers, polyesters and polyvinyl esters.

26. The article of claim 18 wherein said coated substrate embedded in said polymeric matrix material is a fluid impervious conductive composite.

27. The article of claim 20 wherein said coated substrate embedded in said polymeric matrix material is a fluid impervious conductive composite.

28. The article of claim 18 wherein said polymeric matrix material has polarity which is larger than the polarity of polypropylene.

29. The article of claim 20 wherein said polymeric matrix material has polarity which is larger than the polarity of polypropylene.

30. The article of claim 24 wherein said polymeric matrix material is selected from the group consisting of polyethylene, polypropylene, polymethylpentane and mixtures thereof.

31. The article of claim 25 wherein said polymeric matrix material is selected from the group consisting of polyethylene, polypropylene, polymethylpentane and mixtures thereof.

32. The article of claim 6 which further comprises said coated substrate at least partially embedded in a polymeric matrix material.

33. The article of claim 32 wherein said polymeric matrix material is selected from the group consisting of polyolefins, poly vinyl polymers, epoxy-based polymers, phenol-formaldehyde polymers, polyesters and polyvinyl esters.

34. The article of claim 32 wherein said polymeric matrix material has polarity which is larger than the polarity of polypropylene.

35. The article of claim 32 wherein said polymeric matrix material is selected from the group consisting of polyethylene, polypropylene, polymethylpentane and mixtures thereof.

36. The article of claim 6 wherein said particles comprise acid resistant glass having increased acid resistance relative to E-glass.

37. The article of claim 6 wherein said particles comprise acid resistant glass at least as acid resistant as C-glass.

38. The article of claim 6 wherein the average thickness of said doped tin oxide coating on said particles is in the range of about 10 microns or less.

39. The article of claim 36 which further comprises said coated substrate at least partially embedded in a polymeric matrix material.

40. The article of claim 37 which further comprises said coated substrate at least partially embedded in a polymeric matrix material.

41. The article of claim 38 which further comprises said coated substrate at least partially embedded in a polymeric matrix material.

42. An article consisting essentially of an acid resistant substrate other than electrically conductive fluoride ion doped tin oxide in the form of particles or fibers coated with electrically conductive, fluoride ion doped tin oxide.

43. The article of claim 42 wherein said acid resistant substrate is in the form of particles.

44. The article of claim 42 wherein said acid resistant substrate is in the form of fibers.

45. The article of claim 44 wherein said acid resistant substrate is at least an acid resistant as C-glass.

* * * * *

UNITED STATES PATENT AND TRADEMARK OFFICE
CERTIFICATE OF CORRECTION

PATENT NO. : 5,112,706
DATED : May 12, 1992
INVENTOR(S) : Pinsky et al It is certified that error appears in the above-identified patent and that said Letters Patent is hereby corrected as shown below:

Column 2, line 14; delete "SnO2" and insert in place thereof --$SnO_2$--

Column 2, line 19; delete "SnO2" and insert in place thereof --$SnO_2$--

Column 2, line 20; delete "SbCl3" and insert in place thereof --$SbCl_3$--

Column 2, line 26; delete "SnCl2" and insert in place thereof --$SnCl_2$--

Column 2, line 28; delete "SnO2" and insert in place thereof --$SnO_2$--

Column 2, line 29; delete "SnCl2" and insert in place thereof --$SnCl_2$--

Column 2, line 33; delete "SnO2" and insert in place thereof --$SnO_2$--

Column 10, line 55; delete "polymethylpentane" and insert in place thereof --polymethylpentene--

Column 10, line 59; delete "polymethylpentane" and insert in place thereof --polymethylpentene--

UNITED STATES PATENT AND TRADEMARK OFFICE
CERTIFICATE OF CORRECTION

PATENT NO. : 5,112,706

DATED : May 12, 1992

INVENTOR(S) : Pinsky et al

It is certified that error appears in the above-identified patent and that said Letters Patent is hereby corrected as shown below:

Column 11, line 8; delete "polymethypentane" and insert in place thereof --polymethylpentene--

Signed and Sealed this

Tenth Day of August, 1993

Attest:

MICHAEL K. KIRK

Attesting Officer

Acting Commissioner of Patents and Trademarks